United States Patent
Kaihotsu et al.

(10) Patent No.: US 7,133,226 B2
(45) Date of Patent: Nov. 7, 2006

(54) DATA ACCUMULATING METHOD AND APPARATUS

(75) Inventors: Yuji Kaihotsu, Hirakata (JP); Takehiko Yasuda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 113 days.

(21) Appl. No.: 10/839,312

(22) Filed: May 5, 2004

(65) Prior Publication Data

US 2004/0252616 A1 Dec. 16, 2004

(30) Foreign Application Priority Data

May 9, 2003 (JP) .............................. 2003-131668

(51) Int. Cl.
*G11B 5/09* (2006.01)
(52) U.S. Cl. ........................................ 360/8; 369/47.34
(58) Field of Classification Search ...................... None
See application file for complete search history.

(56) References Cited

U.S. PATENT DOCUMENTS

2002/0065043 A1* 5/2002 Hamada ...................... 455/41
2003/0039468 A1 2/2003 Morimoto et al.

FOREIGN PATENT DOCUMENTS

| EP | 0 935 248 | 8/1999 |
|---|---|---|
| EP | 0 997 812 | 5/2000 |
| EP | 1 103 973 | 5/2001 |
| JP | 2002-184108 | 6/2002 |
| WO | WO 01/28222 | 4/2001 |

OTHER PUBLICATIONS

Dreyer K, "Tips, Tools und Player" XP-000930176, No. 7, pp. 194-197, Jul. 1999.
European Search Report corresponding to application No. EP 04 01 0552 dated Sep. 8, 2004.

\* cited by examiner

*Primary Examiner*—Andrea Wellington
*Assistant Examiner*—Varsha A. Kapadia
(74) *Attorney, Agent, or Firm*—RatnerPrestia

(57) ABSTRACT

A data accumulating apparatus, comprising: storage media; receiving means for receiving digital raw data about specific information from an external electronic device; first accumulating means for accumulating the digital raw data received by the receiving means into the storage media; producing means for producing first data equal to the digital raw data accumulated in the storage media; compressing means for compressing the first data produced by the producing means to produce coded data in association with the digital raw data accumulated in the storage media; and second accumulating means for accumulating the digital coded data produced by the compressing means into the storage media.

29 Claims, 8 Drawing Sheets

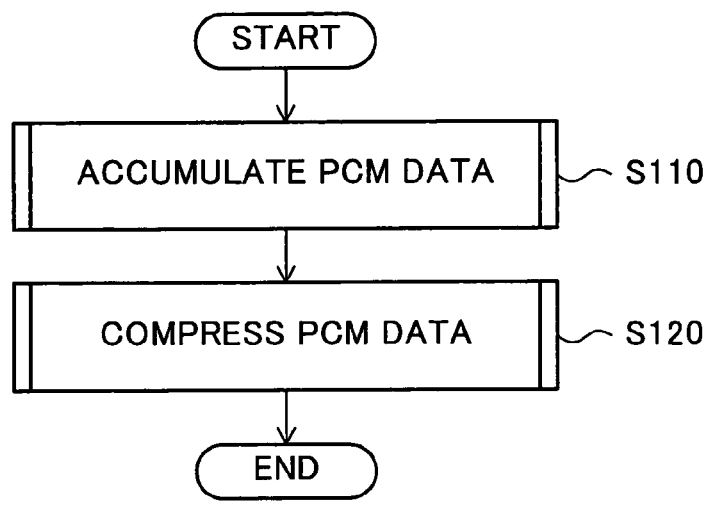
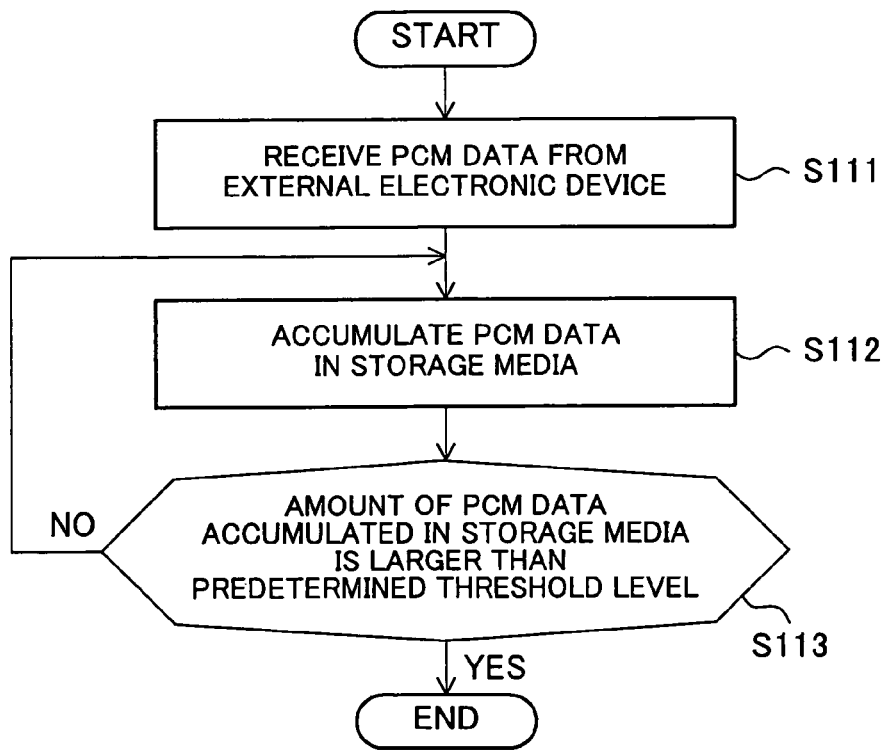

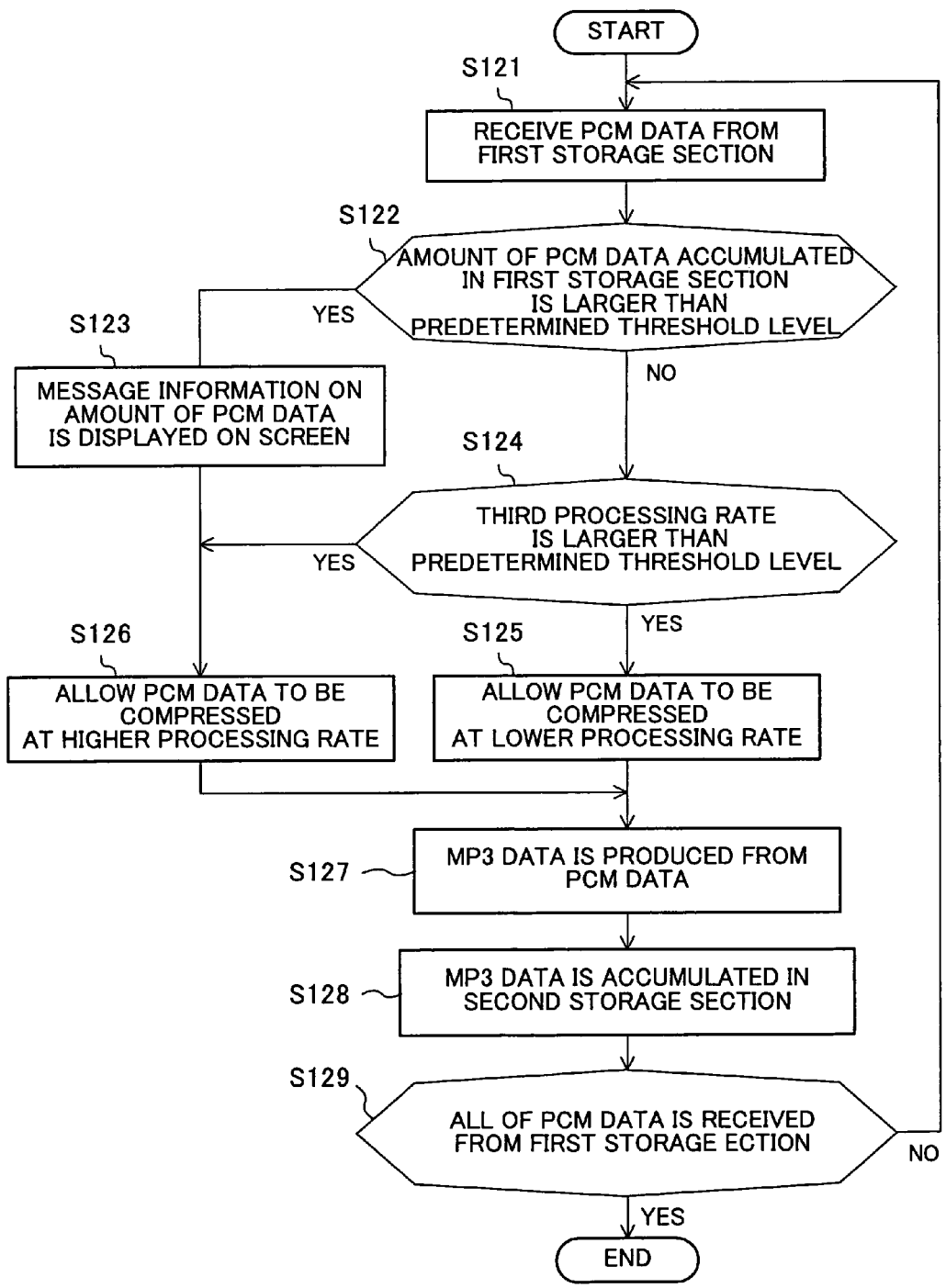

DATA ACCUMULATING METHOD AND APPARATUS

BACKGROUND OF THE INVENTION

1. Field of the Invention

The present invention relates to a data accumulating method and apparatus, and more particularly to a data accumulating method and apparatus available when executing at least two different programs including a first program on compression and accumulation of digital raw data indicative of digital contents made up of specific information on at least one of audio sound, image, and others, and a second program on, for example, vehicle navigation.

2. Description of the Related Art

There has been proposed in the prior art, a wide variety of conventional data accumulating apparatus, one typical example of which is disclosed in Japanese Patent Laying-Open Publication No. 2002-184108.

The conventional data accumulating apparatus 900 is shown in FIG. 9 as comprising a hard disc driver 920 for driving a hard disc 921, and compressing means 910 for receiving a digital raw data on an audio sound from an external electronic device 10 such as, for example, a compact disc driver at a specific processing rate. Digital coded data is produced from the digital raw data by compressing the digital raw data into the digital coded data before accumulating the digital coded data into the hard disc 921.

The compressing means 910 may be constituted by at least one Digital Signal Processor (hereinafter simply referred to as "DSP").

The conventional data accumulating apparatus 900 thus constructed as previously mentioned, however, encounters a problem that the digital raw data tends to fail to be uninterruptedly accumulated into the hard disc 921 by the DSP at the specific processing rate. The conventional data accumulating apparatus 900 is, furthermore, relatively expensive in production cost if the compressing means 910 is constituted by at least one DSP.

On the other hand, the compressing means 910 may be a central processing unit (hereinafter simply referred to as "CPU") for executing at least two different programs including a first program on compression and accumulation of the digital audio data, a second program on, for example, automotive navigation.

The conventional data accumulating apparatus 900 thus constructed as previously mentioned, however, encounters such a problem that the digital raw data tends to fail to be uninterruptedly compressed into the digital coded data when the second program is executed by the CPU on a relatively high preferential basis.

SUMMARY OF THE INVENTION

It is an object of the present invention to provide a data accumulating method and apparatus which can be inexpensive in production cost.

It is, therefore, another object of the present invention to provide a data accumulating method and apparatus which can perform the accumulation and compression of the digital raw data at a relatively high quality.

According to the first aspect of the present invention, there is provided a data accumulating apparatus, comprising: storage media; receiving means for receiving digital raw data about specific information from an external electronic device; first accumulating means for accumulating the digital raw data received by the receiving means into the storage media; compressing means for retrieving the digital raw data from the storage media, and producing digital coded data in association with the digital raw data retrieved from the storage media by compressing the digital raw data retrieved from the storage media into the digital coded data; and second accumulating means for accumulating the digital coded data produced by the compressing means into the storage media.

The receiving means may be adapted to receive the digital raw data from the external electronic device at a first processing rate. The first accumulating means may be adapted to accumulate the digital raw data received by the receiving means into the storage media at a second processing rate. The receiving means may include a measuring unit for measuring the amount of the digital raw data received from the external electronic device over a predetermined period of time and the amount of the digital raw data accumulated in the storage media by the first accumulating means over the predetermined period of time, a judging unit for judging whether or not to update the second processing rate on the basis of the amount measured by the measuring unit of the receiving means, and an updating unit for updating the second processing rate to ensure that the digital raw data received by the receiving means is accumulated by the first accumulating means into the storage media at the updated second processing rate larger than the current second processing rate when the judgment is made that the amount of the digital raw data received from the external electronic device over the predetermined period of time is not smaller than the amount of the digital raw data accumulated in the storage media by the first accumulating means over the predetermined period of time.

The measuring unit, the judging unit, and the updating unit may collectively constitute a direct media access controller.

The compressing means may be adapted to produce digital coded data in association with the digital raw data retrieved from the storage media by compressing the digital raw data retrieved from the storage media into the digital coded data at a third processing rate. The data accumulating apparatus may further comprise measuring means for measuring the amount of the digital raw data retrieved from the storage media over the predetermined period of time by the compressing means; judging means for judging whether or not to update the third processing rate on the basis of the amount measured by the measuring means; and updating means for updating the third processing rate to ensure that the digital raw data retrieved from the storage media is compressed by the compressing means at the updated third processing rate larger than the current third processing rate when the judgment is made that the amount of the digital raw data retrieved from the storage media over the predetermined period of time by the compressing means is not larger than a predetermined threshold level.

The data accumulating apparatus may further comprise reproducing means for reproducing the specific information from the digital raw data accumulated in the storage media.

The data accumulating apparatus may further comprise decompressing means for retrieving the digital coded data from the storage media, and producing digital decoded data from the digital coded data retrieved from the storage media by decompressing the digital coded data retrieved from the storage media, and reproducing means for reproducing the specific information from the digital decoded data produced by the decompressing means.

The decompressing means may be adapted to produce digital decoded data from the digital coded data retrieved from the storage media by decompressing the digital coded data retrieved from the storage media at a fourth processing rate. The decompressing means may include a measuring unit for measuring the amount of the digital decoded data produced by the decompressing means over the predetermined period of time; a judging unit for judging whether or not to update the fourth processing rate on the basis of the amount measured by the measuring unit of the decompressing means; and an updating unit for updating the fourth processing rate to ensure that the digital decoded data is produced by the decompressing means at the updated fourth processing rate larger than the current fourth processing rate when the judgment is made that the amount of the digital decoded data retrieved from the storage media over the predetermined period of time by the compressing means is not larger than a predetermined threshold level.

According to the second aspect of the present invention, there is provided a data accumulating apparatus, comprising: storage media having first and second storage sections different from each other; receiving means for receiving digital raw data about specific information from an external electronic device; first accumulating means for accumulating the digital raw data received by the receiving means into the first storage section of the storage media; compressing means for retrieving the digital raw data from the first storage section of the storage media, and producing digital coded data in association with the digital raw data retrieved from the first storage section of the storage media by compressing the digital raw data retrieved from the first storage section of the storage media into the digital coded data; and second accumulating means for accumulating the digital coded data produced by the compressing means into the second storage section of the storage media.

The receiving means may be adapted to receive the digital raw data from the external electronic device at a first processing rate. The first accumulating means may be adapted to accumulate the digital raw data received by the receiving means into the first storage section of the storage media at a second processing rate. The receiving means may include a measuring unit for measuring the amount of the digital raw data received from the external electronic device over a predetermined period of time and the amount of the digital raw data accumulated in the first storage section of the storage media by the first accumulating means over the predetermined period of time, a judging unit for judging whether or not to update the second processing rate on the basis of the amount measured by the measuring unit of the receiving means, and an updating unit for updating the second processing rate to ensure that the digital raw data received by the receiving means is accumulated by the first accumulating means into the first storage section of the storage media at the updated second processing rate larger than the current second processing rate when the judgment is made that the amount of the digital raw data received from the external electronic device over the predetermined period of time is not smaller than the amount of the digital raw data accumulated in the first storage section of the storage media by the first accumulating means over the predetermined period of time.

The compressing means may be adapted to produce digital coded data in association with the digital raw data retrieved from the first storage section of the storage media by compressing the digital raw data retrieved from the first storage section of the storage media into the digital coded data at a third processing rate. The data accumulating apparatus may further comprise measuring means for measuring the amount of the digital raw data retrieved from the first storage section of the storage media over the predetermined period of time by the compressing means; judging means for judging whether or not to update the third processing rate on the basis of the amount measured by the measuring means; and updating means for updating the third processing rate to ensure that the digital raw data retrieved from the first storage section of the storage media is compressed by the compressing means at the updated third processing rate larger than the current third processing rate when the judgment is made that the amount of the digital raw data retrieved from the first storage section of the storage media over the predetermined period of time by the compressing means is not larger than a predetermined threshold level.

The data accumulating apparatus may further comprise reproducing means for reproducing the specific information from the digital raw data accumulated in the first storage section of the storage media.

The data accumulating apparatus may further comprise decompressing means for retrieving the digital coded data from the second storage section of the storage media, and producing digital decoded data from the digital coded data retrieved from the second storage section of the storage media by decompressing the digital coded data retrieved from the second storage section of the storage media, and reproducing means for reproducing the specific information from the digital decoded data produced by the decompressing means.

The decompressing means may be adapted to produce digital decoded data from the digital coded data retrieved from the second storage section of the storage media by decompressing the digital coded data retrieved from the second storage section of the storage media at a fourth processing rate. The decompressing means may include a measuring unit for measuring the amount of the digital decoded data produced by the decompressing means over the predetermined period of time; a judging unit for judging whether or not to update the fourth processing rate on the basis of the amount measured by the measuring unit; and an updating unit for updating the fourth processing rate to ensure that the digital decoded data is produced by the decompressing means at the updated fourth processing rate larger than the current fourth processing rate when the judgment is made that the amount of the digital decoded data retrieved from the second storage section of the storage media over the predetermined period of time by the compressing means is not larger than a predetermined threshold level.

The measuring means may be adapted to measure the amount of the digital raw data retrieved from the first storage section of the storage media by the compressing means before measuring the difference between the amount of the digital raw data accumulated in the first storage section of the storage media by the first accumulating means and the amount of the digital raw data retrieved from the first storage section of the storage media by the compressing means. The judging means may be adapted to judge whether or not to update the third processing rate on the basis of the amount measured by the measuring means. The updating means may be adapted to update the third processing rate to ensure that the digital raw data retrieved from the first storage section of the storage media is compressed by the compressing means at the updated third processing rate larger than the current third processing rate when the judgment is made that the difference between the amount of the digital raw data accumulated in the first storage section of the storage media by the first accumulating means and the amount of the digital raw data retrieved from the first storage section of the storage media by the compressing means is larger than a predetermined threshold level.

The data accumulating apparatus may further comprise a display unit having a screen; and control signal producing means for producing a control signal to have the display unit display an image in association with the notification message about the judgment of the judging means on the screen of the display unit.

The data accumulating apparatus may further comprise a speaker unit; and control signal producing means for producing a control signal to have the speaker unit produce a sound in association with the notification message about the judgment of the judging means on the screen of the display unit.

According to the third aspect of the present invention, there is provided a data accumulating apparatus, comprising: storage media; receiving means for receiving digital raw data about specific information from an external electronic device; first accumulating means for accumulating the digital raw data received by the receiving means into the storage media; a computer unit for executing at least two different programs including first and second programs different from each other, the first program including compressing step of retrieving the digital raw data from the storage media, and producing digital coded data in association with the digital raw data retrieved from the storage media by compressing the digital raw data retrieved from the storage media into the digital coded data, and accumulating step of accumulating the digital coded data produced in the compressing step into the storage media at a third processing rate in association with the priority for the compression of the digital raw data retrieved from the storage media, and the second program including a measuring step of measuring the amount of the digital raw data retrieved from the storage media over the predetermined period of time in the compressing step, a judging step of judging whether or not to update the third processing rate on the basis of the amount measured in the measuring step, and an updating step of updating the third processing rate to ensure that the digital raw data retrieved from the storage media is compressed in the compressing step at the updated third processing rate larger than the current third processing rate when the judgment is made that the amount of the digital raw data retrieved from the storage media over the predetermined period of time in the compressing step is not larger than a predetermined threshold level.

The first program may include a reproducing step of reproducing the specific information from the digital raw data accumulated in the storage media.

The first program may include a decompressing step of retrieving the digital coded data from the storage media, and producing digital decoded data from the digital coded data retrieved from the storage media by decompressing the digital coded data retrieved from the storage media at a fourth processing rate in association with the priority for the decompression of the digital coded data retrieved from the storage media, and a reproducing step of reproducing the specific information from the digital decoded data produced in the decompressing step. The second program may include a measuring step of measuring the amount of the digital decoded data produced in the decompressing step over the predetermined period of time, a judging step of judging whether or not to update the fourth processing rate on the basis of the amount measured in the measuring step, and an updating step of updating the fourth processing rate to ensure that the digital decoded data is produced in the decompressing step at the updated fourth processing rate larger than the current fourth processing rate when the judgment is made that the amount of the digital decoded data retrieved from the storage media over the predetermined period of time in the compressing step is not larger than a predetermined threshold level.

According to the fourth aspect of the present invention, there is provided a data accumulating method, comprising: a receiving step of receiving digital raw data about specific information from an external electronic device; a first accumulating step of accumulating the digital raw data received by the receiving means into the storage media; a compressing step of retrieving the digital raw data from the storage media, and producing digital coded data in association with the digital raw data retrieved from the storage media by compressing the digital raw data retrieved from the storage media into the digital coded data; and a second accumulating step of accumulating the digital coded data produced in the compressing step into the storage media.

The receiving step may be of receiving the digital raw data from the external electronic device at a first processing rate. The first accumulating step is of accumulating the digital raw data received by the receiving means into the storage media at a second processing rate. The receiving step may include a measuring step of measuring the amount of the digital raw data received from the external electronic device over a predetermined period of time and the amount of the digital raw data accumulated in the storage media in the first accumulating step over the predetermined period of time, a judging step of judging whether or not to update the second processing rate on the basis of the amount measured in the measuring step, and an updating step of updating the second processing rate to ensure that the digital raw data received in the first receiving step is accumulated in the first accumulating step into the storage media at the updated second processing rate larger than the current second processing rate when the judgment is made that the amount of the digital raw data received from the external electronic device over the predetermined period of time is not smaller than the amount of the digital raw data accumulated in the storage media in the first accumulating step over the predetermined period of time.

The compressing step may be of producing digital coded data in association with the digital raw data retrieved from the storage media by compressing the digital raw data retrieved from the storage media into the digital coded data at a third processing rate in the compressing step. The data accumulating apparatus may further comprise a measuring step of measuring the amount of the digital raw data retrieved from the storage media over the predetermined period of time in the compressing step; a judging step of judging whether or not to update the third processing rate on the basis of the amount measured in the measuring step; and an updating step of updating the third processing rate to ensure that the digital raw data retrieved from the storage media is compressed in the compressing step at the updated third processing rate larger than the current third processing rate when the judgment is made that the amount of the digital raw data retrieved from the storage media over the predetermined period of time in the compressing step is not larger than a predetermined threshold level.

The data accumulating apparatus may further comprise a reproducing step of reproducing the specific information from the digital raw data accumulated in the storage media.

The data accumulating apparatus may further comprise a decompressing step of retrieving the digital coded data from the storage media, and producing digital decoded data from the digital coded data retrieved from the storage media by decompressing the digital coded data retrieved from the storage media, and a reproducing step of reproducing the specific information from the digital decoded data produced in the decompressing step.

The compressing step may be of producing digital coded data in association with the digital raw data retrieved from the storage media by compressing the digital raw data retrieved from the storage media into the digital coded data at a third processing rate. The data accumulating apparatus may further comprise a measuring step of measuring the amount of the digital raw data retrieved from the storage media over the predetermined period of time in the compressing step; a judging step of judging whether or not to update the third processing rate on the basis of the amount measured in the measuring step; and an updating step of updating the third processing rate to ensure that the digital raw data retrieved from the storage media is compressed in the compressing step at the updated third processing rate larger than the current third processing rate when the judgment is made that the amount of the digital raw data retrieved from the storage media over the predetermined period of time in the compressing step is not larger than a predetermined threshold level.

The decompressing step may be of producing digital decoded data from the digital coded data retrieved from the storage media by decompressing the digital coded data retrieved from the storage media at a fourth processing rate. The decompressing step may include a measuring step of measuring the amount of the digital decoded data produced in the decompressing step over the predetermined period of time; a judging step of judging whether or not to update the fourth processing rate on the basis of the amount measured in the measuring step; and an updating step of updating the fourth processing rate to ensure that the digital decoded data is produced in the decompressing step at the updated fourth processing rate larger than the current fourth processing rate when the judgment is made that the amount of the digital decoded data retrieved from the storage media over the predetermined period of time in the compressing step is not larger than a predetermined threshold level.

BRIEF DESCRIPTION OF THE DRAWINGS

The features and advantages of a data accumulating method and apparatus according to the present invention will be more clearly understood from the following description taken in conjunction with the accompanying drawings in which:

FIG. 2 is a flowchart showing an operation of the data accumulating apparatus according to the first embodiment of the present invention;

FIG. 3 is a flowchart showing an accumulating process of the data accumulating apparatus according to the first embodiment of the present invention;

FIG. 4 is a flowchart showing a compressing process of the data accumulating apparatus according to the first embodiment of the present invention;

DESCRIPTION OF THE PREFERRED EMBODIMENTS

Figure 1:
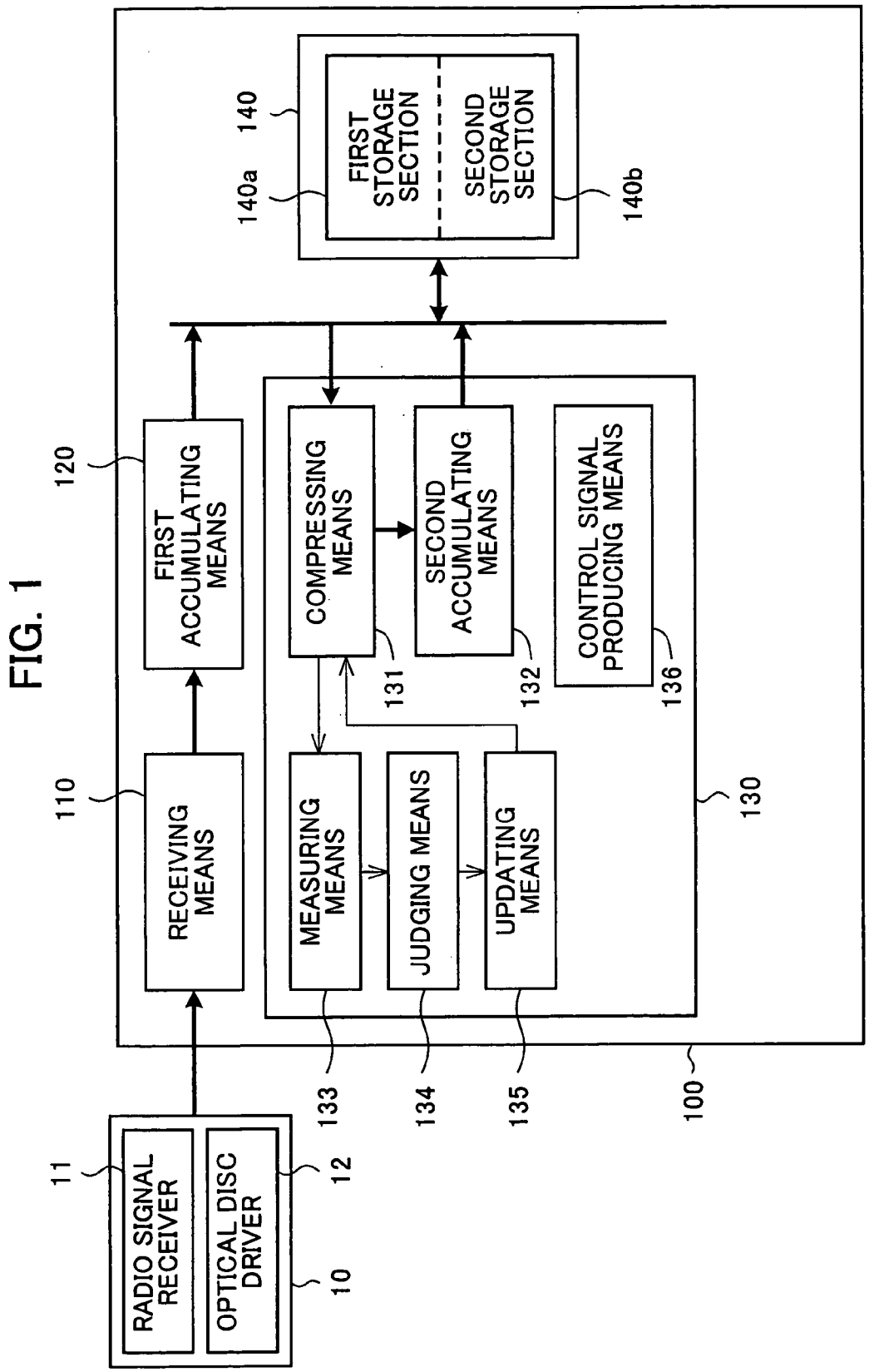
FIG. 1 is a block diagram of the first embodiment of the data accumulating apparatus according to the present invention.

Referring now to FIGS. 1 to 8 of the drawings, there are shown first to third embodiments of the data accumulating method and apparatus according to the present invention.

The following description will now be directed to the constitution of the data accumulating apparatus according to the first embodiment of the present invention.

The data accumulating apparatus 100 comprises storage media 140, receiving means 110 for receiving digital raw data in association with digital contents made up of at least one of audio sound, image, and others from an external electronic device 10, first accumulating means 120 for accumulating the digital raw data received by the receiving means 110 into the storage media 140, compressing means 131 for retrieving the digital raw data from the storage media 140, and producing digital coded data in association with the digital raw data retrieved from the storage media 140 by compressing the digital raw data retrieved from the storage media 140 into the digital coded data, and second accumulating means 132 for accumulating the digital coded data produced by the compressing means 131 into the storage media 140.

The receiving means 110 is adapted to receive the digital raw data from the external electronic device 10 at a first processing rate, while the first accumulating means 120 is adapted to accumulate the digital raw data received by the receiving means 110 into the storage media 140 at a second processing rate.

The receiving means 110 includes a measuring unit for measuring the amount of the digital raw data received from the external electronic device 10 over a predetermined period of time and the amount of the digital raw data accumulated in the storage media 140 by the first accumulating means 120 over the predetermined period of time, a judging unit for judging whether or not the amount of the digital raw data received from the external electronic device 10 over the predetermined period of time is smaller than the amount of the digital raw data accumulated in the storage media 140 by the first accumulating means 120 over the predetermined period of time on the basis of the measurement of the measuring unit, and an updating unit for updating the second processing rate to ensure that the digital raw data received by the receiving means 110 is accumulated by the first accumulating means 120 into the storage media 140 at the updated second processing rate larger than the second processing rate when the judgment is made that the amount of the digital raw data received from the external electronic device 10 over the predetermined period of time is not smaller than the amount of the digital raw data accumulated in the storage media 140 by the first accumulating means 120 over the predetermined period of time.

The measuring unit, the judging unit, and the updating unit each forming part of the receiving means 110 collectively constitute a direct media access controller.

The compressing means 131 is adapted to produce digital coded data in association with the digital raw data retrieved from the storage media 140 by compressing the digital raw data retrieved from the storage media 140 into the digital coded data at a third processing rate.

The data accumulating apparatus 100 further comprises measuring means 133 for measuring the amount of the digital raw data retrieved from the storage media 140 over the predetermined period of time by the compressing means 131, judging means 134 for judging whether or not the amount of the digital raw data retrieved from the storage media 140 over the predetermined period of time by the compressing means 131 is larger than a predetermined threshold level on the basis of the measurement of the measuring means 133, and updating means 135 for updating the third processing rate to ensure that the digital raw data retrieved from the storage media 140 is compressed by the compressing means 131 at the updated third processing rate larger than the third processing rate when the judgment is made that the amount of the digital raw data retrieved from the storage media 140 over the predetermined period of time by the compressing means 131 is not larger than the predetermined threshold level.

Here, the external electronic device 10 may include a radio set 11 for receiving and producing digital raw data about audio information, and an optical disc driver 12 for producing digital raw data about audio and image information while driving an optical disc such as for example compact disc and digital versatile disc.

The receiving means 110 may be adapted to receive the digital raw data about the audio and image data from the external electronic device 10 at the first processing rate, while the first accumulating means 120 may be adapted to accumulate the digital raw data received by the receiving means 110 into the first storage section 140a of the storage media 140 at the first processing rate.

The digital raw data may include pulse code modulation data (simply referred to as "PCM data"), while the digital coded data may include MPEG-1 Audio Layer 3 (simply referred to as "MP3 data").

Here, the PCM data may be received from the external electronic device 10 by the receiving means 110 at a fundamental transmission rate to be specified by sampling frequency 44.1 kHz and quantifying bit number 16.

The compressing means 131 and the second accumulating means 132 may be collectively constituted by a computer unit (simply referred to as "CPU") 130 for selectively executing at least two different programs including first and second programs different from each other, the first program including compressing step of retrieving the digital raw data from the storage media 140, and producing digital coded data in association with the digital raw data retrieved from the storage media 140 by compressing the digital raw data retrieved from the storage media 140 into the digital coded data, and accumulating step of accumulating the digital coded data produced in the compressing step into the storage media 140 at a third processing rate in association with the priority for the compression of the digital raw data retrieved from the storage media 140, and the second program including a measuring step of measuring the amount of the digital raw data retrieved from the storage media 140 over the predetermined period of time in the compressing step, a judging step of judging whether or not the amount of the digital raw data retrieved from the storage media 140 over the predetermined period of time in the compressing step is larger than a predetermined threshold level on the basis of the measurement of the measuring step, and a updating step of updating the third processing rate to ensure that the digital raw data retrieved from the storage media 140 is compressed in the compressing step at the updated third processing rate larger than the third processing rate when the judgment is made that the amount of the digital raw data retrieved from the storage media 140 over the predetermined period of time in the compressing step is not larger than the predetermined threshold level.

The following description will be directed to the case that the storage media 140 has first and second storage sections 140a and 140b different from each other.

The data accumulating apparatus 100 is shown in FIG. 1 as comprising storage media 140 having first and second storage sections 140a and 140b different from each other, receiving means 110 for receiving digital raw data about specific information from an external electronic device 10, first accumulating means 120 for accumulating the digital raw data received by the receiving means 110 into the first storage section 140a of the storage media 140, compressing means 131 for retrieving the digital raw data from the first storage section 140a of the storage media 140, and producing digital coded data in association with the digital raw data retrieved from the first storage section 140a of the storage media 140 by compressing the digital raw data retrieved from the first storage section 140a of the storage media 140 into the digital coded data, and second accumulating means 132 for accumulating the digital coded data produced by the compressing means 131 into the second storage section 140b of the storage media 140.

The receiving means 110 is adapted to receive the digital raw data from the external electronic device 10 at a first processing rate, while the first accumulating means 120 is adapted to accumulate the digital raw data received by the receiving means 110 into the first storage section 140a of the storage media 140 at a second processing rate.

The receiving means 110 includes a measuring unit for measuring the amount of the digital raw data received from the external electronic device 10 over a predetermined period of time and the amount of the digital raw data accumulated in the first storage section 140a of the storage media 140 by the first accumulating means 120 over the predetermined period of time, a judging unit for judging whether or not the amount of the digital raw data received from the external electronic device 10 over the predetermined period of time is smaller than the amount of the digital raw data accumulated in the first storage section 140a of the storage media 140 by the first accumulating means 120 over the predetermined period of time on the basis of the measurement of the measuring unit, and an updating unit for updating the second processing rate to ensure that the digital raw data received by the receiving means 110 is accumulated by the first accumulating means 120 into the first storage section 140a of the storage media 140 at the updated second processing rate larger than the second processing rate when the judgment is made that the amount of the digital raw data received from the external electronic device 10 over the predetermined period of time is not smaller than the amount of the digital raw data accumulated in the first storage section 140a of the storage media 140 by the first accumulating means 120 over the predetermined period of time.

The compressing means 131 is adapted to produce digital coded data in association with the digital raw data retrieved from the first storage section 140a of the storage media 140 by compressing the digital raw data retrieved from the first storage section 140a of the storage media 140 into the digital coded data at a third processing rate.

The data accumulating apparatus 100 further comprises measuring means 133 for measuring the amount of the digital raw data retrieved from the first storage section 140*a* of the storage media 140 over the predetermined period of time by the compressing means 131, judging means 134 for judging whether or not the amount of the digital raw data retrieved from the first storage section 140*a* of the storage media 140 over the predetermined period of time by the compressing means 131 is larger than a predetermined threshold level on the basis of the measurement of the measuring means 133, and updating means 135 for updating the third processing rate to ensure that the digital raw data retrieved from the first storage section 140*a* of the storage media 140 is compressed by the compressing means 131 at the updated third processing rate larger than the third processing rate when the judgment is made that the amount of the digital raw data retrieved from the first storage section 140*a* of the storage media 140 over the predetermined period of time by the compressing means 131 is not larger than the predetermined threshold level.

The data accumulating apparatus 100 further comprises control signal producing means 136 for producing a control signal to have the display unit display an image in association with the notification message about the judgment of the judging means 134 on the screen of the display unit. On the other hand, the data accumulating apparatus 100 may further comprises control signal producing means 136 for producing a control signal to have the speaker unit produce a sound in association with the notification message about the judgment of the judging means 134 on the screen of the display unit.

Here, the compressing means 131 and the second accumulating means 132 may be collectively constituted by a computer unit (simply referred to as "CPU") 130 for executing at least two different programs including first and second programs different from each other, the first program including compressing step of retrieving the digital raw data from the storage media 140, and producing digital coded data in association with the digital raw data retrieved from the storage media 140 by compressing the digital raw data retrieved from the storage media 140 into the digital coded data, and accumulating step of accumulating the digital coded data produced in the compressing step into the storage media 140 at a third processing rate in association with the priority for the compression of the digital raw data retrieved from the storage media 140, and the second program including a measuring step of measuring the amount of the digital raw data retrieved from the storage media 140 over the predetermined period of time in the compressing step, a judging step of judging whether or not the amount of the digital raw data retrieved from the storage media 140 over the predetermined period of time in the compressing step is larger than a predetermined threshold level on the basis of the measurement of the measuring step, and a updating step of updating the third processing rate to ensure that the digital raw data retrieved from the storage media 140 is compressed in the compressing step at the updated third processing rate larger than the third processing rate when the judgment is made that the amount of the digital raw data retrieved from the storage media 140 over the predetermined period of time in the compressing step is not larger than the predetermined threshold level.

The following description will now be directed to the constitution of the data accumulating method according to the first embodiment of the present invention.

The data accumulating method comprises a receiving step of receiving digital raw data about specific information from an external electronic device 10, a first accumulating step of accumulating the digital raw data received by the receiving means 110 into the storage media 140, a compressing step of retrieving the digital raw data from the storage media 140, and producing digital coded data in association with the digital raw data retrieved from the storage media 140 by compressing the digital raw data retrieved from the storage media 140 into the digital coded data; and a second accumulating step of accumulating the digital coded data produced in the compressing step into the storage media 140.

The receiving step is of receiving the digital raw data from the external electronic device 10 at a first processing rate, while the first accumulating step is of accumulating the digital raw data received by the receiving means 110 into the storage media 140 at a second processing rate.

The receiving step includes a measuring step of measuring the amount of the digital raw data received from the external electronic device 10 over a predetermined period of time and the amount of the digital raw data accumulated in the storage media 140 in the first accumulating step over the predetermined period of time, a judging step of judging whether or not the amount of the digital raw data received from the external electronic device 10 over the predetermined period of time is smaller than the amount of the digital raw data accumulated in the storage media 140 in the first accumulating step over the predetermined period of time on the basis of the measurement of the measuring unit, and an updating step of updating the second processing rate to ensure that the digital raw data received in the first receiving step is accumulated in the first accumulating step into the storage media 140 at the updated second processing rate larger than the second processing rate when the judgment is made that the amount of the digital raw data received from the external electronic device 10 over the predetermined period of time is not smaller than the amount of the digital raw data accumulated in the storage media 140 in the first accumulating step over the predetermined period of time.

The compressing step is of producing digital coded data in association with the digital raw data retrieved from the storage media 140 by compressing the digital raw data retrieved from the storage media 140 into the digital coded data at a third processing rate in the compressing step.

The data accumulating method further comprises a measuring step of measuring the amount of the digital raw data retrieved from the storage media 140 over the predetermined period of time in the compressing step, a judging step of judging whether or not the amount of the digital raw data retrieved from the storage media 140 over the predetermined period of time in the compressing step is larger than a predetermined threshold level, and an updating step of updating the third processing rate to ensure that the digital raw data retrieved from the storage media 140 is compressed in the compressing step at the updated third processing rate larger than the third processing rate when the judgment is made that the amount of the digital raw data retrieved from the storage media 140 over the predetermined period of time in the compressing step is not larger than the predetermined threshold level.

The process of the data accumulating method and apparatus according to the first embodiment of the present invention will now be described hereinafter with reference to FIG. 2.

The digital raw data, i.e., the PCM data is firstly received from the optical disc driver 12 of the external electronic device 10 at the first processing rate by the first receiving means 110. The PCM data received by the first receiving means 110 is sequentially accumulated into the first storage section 140*a* of the storage media 140 by the first accumulating means 120 in the step S110.

The PCM data is sequentially retrieved from the first storage section 140a of the storage media 140. The digital coded data, i.e., the MP3 data in association with the PCM data retrieved from the first storage section 140a of the storage media 140 is then produced by the compressing means 131. The MP3 data produced by the compressing unit 131 is sequentially accumulated into the second storage section 140b of the storage media 140 by the second accumulating means 132 in the step S120.

The accumulation process of the data accumulating method and apparatus according to the first embodiment of the present invention will now be described hereinafter with reference to FIG. 3.

The PCM data is firstly received from the optical disc driver 12 of the external electronic device 10 at the first processing rate by the first receiving means 110 in the step S111. The PCM data received by the first receiving means 110 is sequentially accumulated into the first storage section 140a of the storage media 140 by the first accumulating means 120 in the step S112.

The judgment is made whether or not the amount of the PCM data accumulated in the first storage section 140a of the storage media 140 over the predetermined period of time by the first accumulating means 131 is larger than the predetermined threshold level in the step S113.

When the answer in the step S113 is negative "NO", i.e., the amount of the PCM data accumulated in the first storage section 140a of the storage media 140 over the predetermined period of time by the first accumulating means 131 is not larger than the predetermined threshold level, the step S113 proceeds to the step S112.

The compression and accumulation process of the data accumulating method and apparatus according to the first embodiment of the present invention will be then described in detail with reference to FIG. 4.

The PCM data accumulated in the first storage section 140a of the storage media 140 is sequentially received from the first storage section 140a of the storage media 140 by the compressing means 131 in the step S121.

The amount of the PCM data retrieved from the first storage section 140a of the storage media 140 over the predetermined period of time by the compressing means 131 is measured by the measuring means 133. The judgment is made by the judging means 134 whether or not the amount of the PCM data accumulated in the first storage section 140a of the storage media 140 by the first accumulating means 120 is larger than the predetermined threshold level on the basis of the measurement of the measuring unit of the receiving means 110 in the step S122.

When the answer in the step S122 is affirmative "YES", i.e., the amount of the PCM data accumulated in the first storage section 140a of the storage media 140 by the first accumulating means 120 is larger than the predetermined threshold level, the control signal is produced by the control signal producing means 136. The notification message is then displayed on the screen in response to the control signal produced by the control signal producing means 136 in the step S123.

The updating means 135 is then operated to update the third processing rate to ensure that the PCM data retrieved from the first storage section 140a of the storage media 140 is compressed by the compressing means 131 at the updated third processing rate larger than the current third processing rate on a relatively high preferential basis in the step S126.

When, on the other hand, the answer in the step S122 is negative "NO", i.e., the amount of the PCM data accumulated in the first storage section 140a of the storage media 140 by the first accumulating means 120 is not larger than the predetermined threshold level, the judgment is made by the judging means 134 whether or not the amount of the PCM data retrieved from the first storage section 140a of the storage media 140 over the predetermined period of time by the compressing means 131 is larger than the predetermined threshold level on the basis of the measurement of the measuring means 133 in the step S124.

When the answer in the step S122 is affirmative "YES", i.e., the amount of the PCM data retrieved from the first storage section 140a of the storage media 140 over the predetermined period of time by the compressing means 131 is larger than the predetermined threshold level, the step S124 proceeds to the step S126.

When, on the other hand, the answer in the step S122 is negative "NO", i.e., the amount of the PCM data retrieved from the first storage section 140a of the storage media 140 over the predetermined period of time by the compressing means 131 is not larger than the predetermined threshold level, the PCM data retrieved from the first storage section 140a of the storage media 140 is compressed by the compressing means 131 at the updated third processing rate smaller than the current third processing rate on a relatively low preferential basis in the step S127.

The PCM data compressed by the compressing means 131, i.e., the MP3 data is accumulated in the second storage section 140a of the storage media 140 in the step S128.

The judgment is made whether or not all of the PCM data accumulated in the first storage section 140a of the storage media 140 is retrieved by the compressing means 131 in the step S129.

When the answer in the step S129 is negative "NO", i.e., all of the PCM data accumulated in the first storage section 140a of the storage media 140 is not retrieved by the compressing means 131, the step S129 proceeds to the step S121.

From the above detail description, it will be understood that the data accumulating method and apparatus according to the first embodiment of the present invention can perform the accumulation and compression of the digital raw data at the relatively high quality.

While there has been described in the foregoing embodiment about the fact that the external electronic device 10 includes a radio set 11 for receiving and producing digital raw data, the external electronic device 10 may include a television set for producing audio and image data.

While there has been described in the forgoing embodiment about the fact that the measuring means 133 is adapted to measure the amount of the digital raw data retrieved from the first storage section 140a of the storage media 140 over the predetermined period of time by the compressing means 131, the measuring means 133 may be adapted to measure the amount of the digital raw data retrieved from the first storage section 140a of the storage media 140 by the compressing means 131 before measuring the difference between the amount of the digital raw data accumulated in the first storage section 140a of the storage media 140 by the first accumulating means 120 and the amount of the digital raw data retrieved from the first storage section 140a of the storage media 140 by the compressing means 131.

While there has been described in the forgoing embodiment about the fact that the judging means 134 is adapted to judge whether or not the amount of the digital raw data retrieved from the first storage section 140a of the storage media 140 over the predetermined period of time by the compressing means 131 is larger than a predetermined threshold level on the basis of the measurement of the measuring means 133, the judging means 134 may be adapted to judge whether or not the amount of the digital raw data retrieved from the first storage section 140a of the storage media 140 over the predetermined period of time by the compressing means 131 is larger than a predetermined threshold level on the basis of the measurement of the measuring means 133 before judging whether or not the difference between the amount of the digital raw data accumulated in the first storage section 140a of the storage media 140 by the first accumulating means 120 and the amount of the digital raw data retrieved from the first storage section 140a of the storage media 140 by the compressing means 131 is larger than a predetermined threshold level on the basis of the measurement of the measuring unit of the measuring means 133.

While there has been described in the forgoing embodiment about the fact that the updating means 135 is adapted to update the third processing rate to ensure that the digital raw data retrieved from the first storage section 140a of the storage media 140 is compressed by the compressing means 131 at the updated third processing rate larger than the third processing rate when the judgment is made that the amount of the digital raw data retrieved from the first storage section 140a of the storage media 140 over the predetermined period of time by the compressing means 131 is not larger than the predetermined threshold level, the updating means 135 may be adapted to update the third processing rate to ensure that the digital raw data retrieved from the first storage section 140a of the storage media 140 is compressed by the compressing means 131 at the updated third processing rate larger than the third processing rate when the judgment is made that the difference between the amount of the digital raw data accumulated in the first storage section 140a of the storage media 140 by the first accumulating means 120 and the amount of the digital raw data retrieved from the first storage section 140a of the storage media 140 by the compressing means 131 is larger than a predetermined threshold level.

In the foregoing embodiment, the external electronic device 10 may be replaced by a server for delivering raw audio and image data over mobile networks.

Here, while there has been described in the present embodiment about the fact that the digital raw data is firstly received from the optical disc driver 11 of the external electronic device 10 at the first processing rate by the receiving means 110, the digital raw data may be firstly received from the radio set 11 of the external electronic device 10 at the first processing rate by the receiving means 110.

Although there has been described in the above about the first embodiment of the data accumulating apparatus according to the present invention, this embodiment may be replaced by the second and third embodiments of the data accumulating apparatus according to the present invention in order to attain the objects of the present invention. The second and third embodiments of the data accumulating apparatus will then be described hereinafter.

Figure 5:
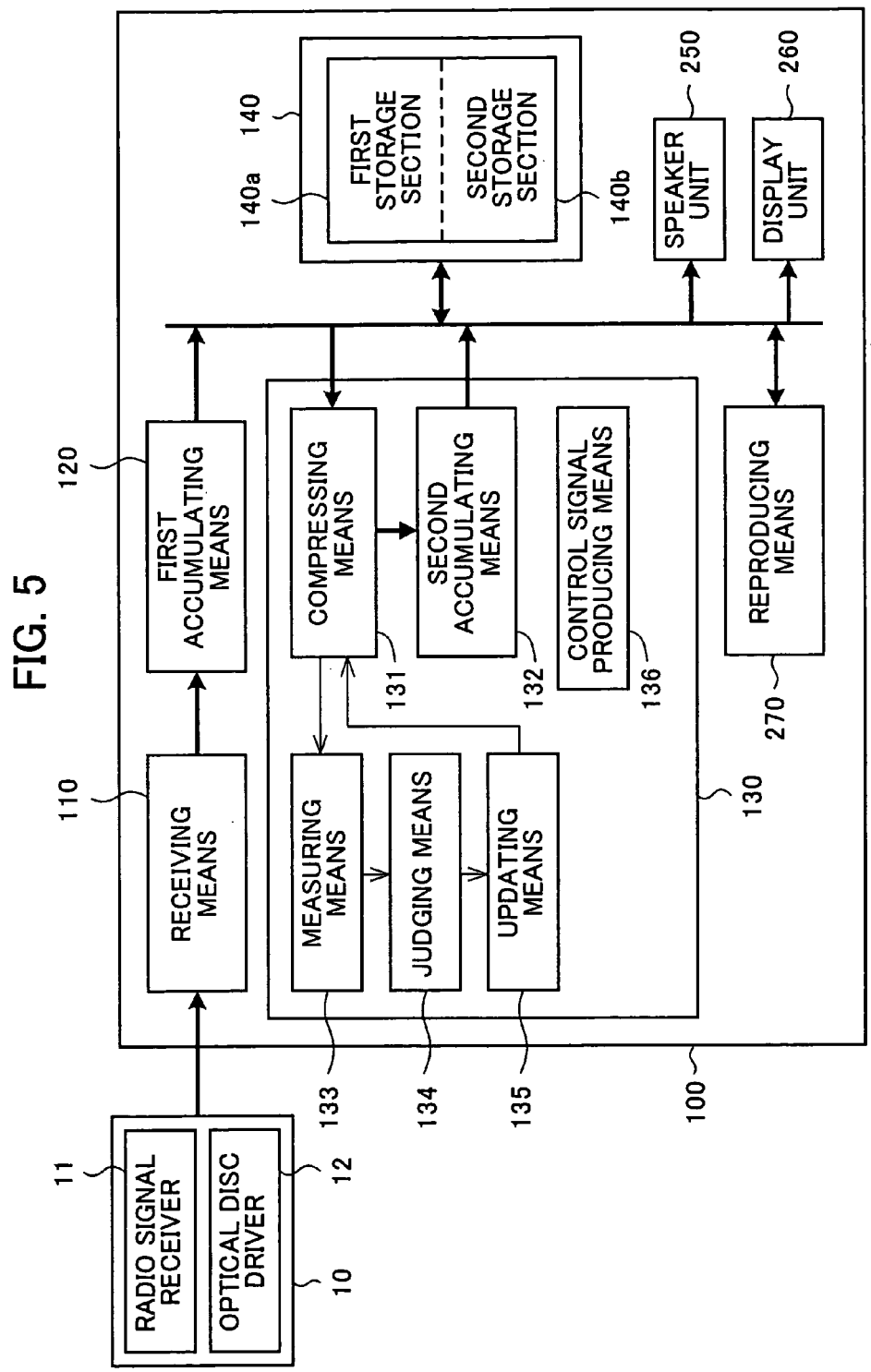
FIG. 5 is a block diagram of the second embodiment of the data accumulating apparatus according to the present invention.
Figure 7:
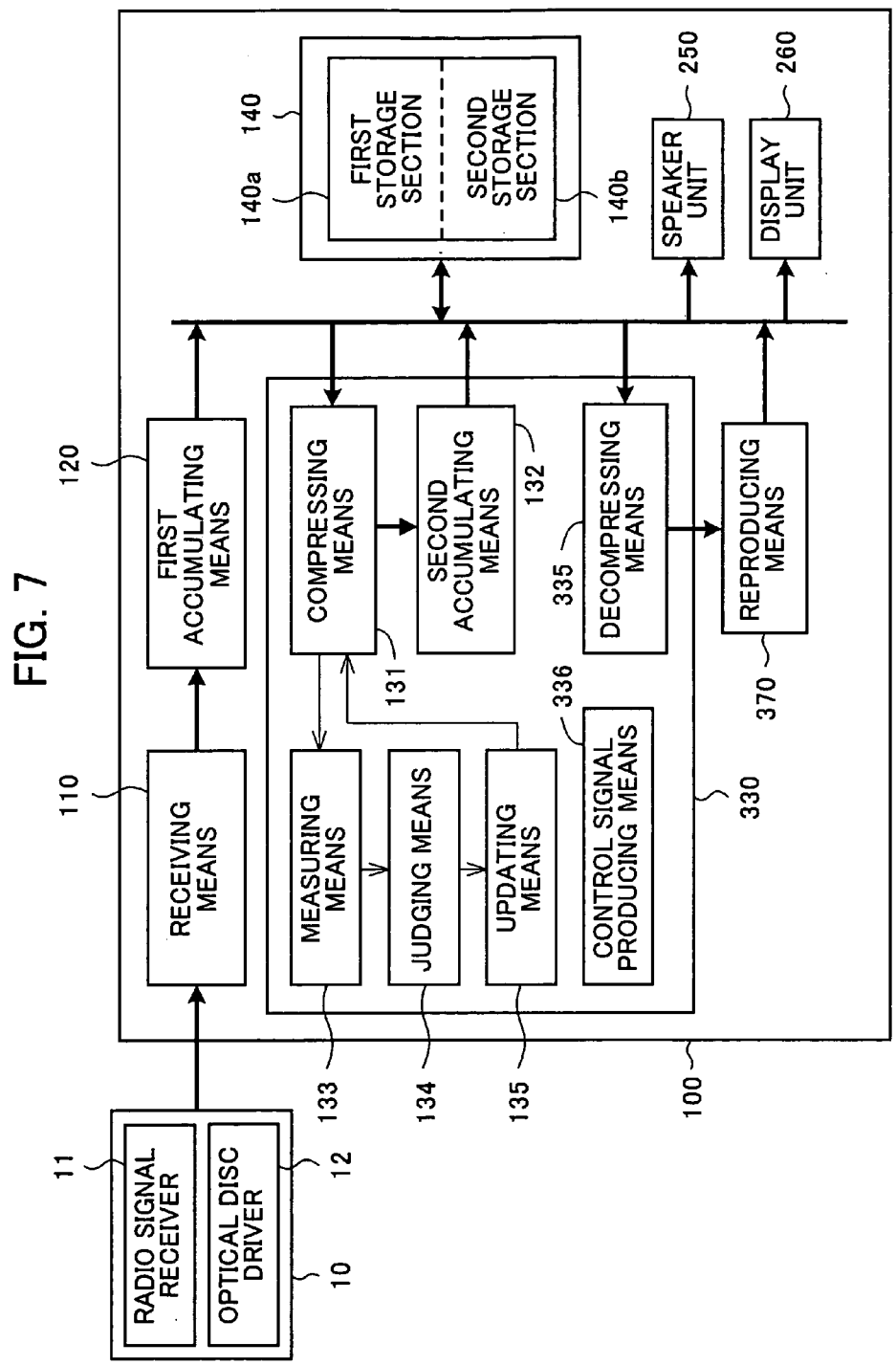
FIG. 7 is a block diagram of the third embodiment of the data accumulating apparatus according to the present invention.

Referring then to FIGS. 5 and 7 of the drawings, there are shown block diagrams of the second and third embodiments of the data accumulating apparatus according to the present invention. The constitutional elements and the steps of the second and third embodiments of the data accumulating apparatus according to the present invention as shown in FIGS. 5 and 7 are entirely the same as those of the first embodiment of the data accumulating apparatus according to the present invention as shown in FIG. 1 except for the constitutional elements and the steps appearing in the following description. Therefore, only the constitutional elements and the steps of the second and third embodiments of the data accumulating apparatus different from those of the first embodiment of the data accumulating apparatus will be described in detail hereinafter. The constitutional elements and the steps of the second and third embodiments of the data accumulating apparatus entirely the same as those of the first embodiment of the data accumulating apparatus will not be described but bear the same reference numerals and legends as those of the first embodiment of the data accumulating apparatus in FIG. 1 to avoid tedious repetition.

The following description will be directed to the constitutional elements and the steps of the second embodiment of the data accumulating apparatus different from those of the first embodiment of the data accumulating apparatus.

The data accumulating apparatus 200 is shown in FIG. 5 as comprising storage media 140 having first and second storage sections 141a and 141b different from each other; receiving means 110 for receiving digital raw data about specific information from an external electronic device 10, first accumulating means 120 for accumulating the digital raw data received by the receiving means 110 into the first storage section 140a of the storage media 140, compressing means 131 for retrieving the digital raw data from the first storage section 140a of the storage media 140, and producing digital coded data in association with the digital raw data retrieved from the first storage section 140a of the storage media 140 by compressing the digital raw data retrieved from the first storage section 140a of the storage media 140 into the digital coded data, and second accumulating means 132 for accumulating the digital coded data produced by the compressing means 131 into the second storage section 140b of the storage media 140.

The external electronic device 10 may include a radio set 11 for receiving and producing digital raw data about audio information, and an optical disc driver 12 for producing digital raw data about audio and image information while driving an optical disc such as for example compact disc and digital versatile disc.

The receiving means 110 may be adapted to receive the digital raw data about the audio and image data from the external electronic device 10 at the first processing rate, while the first accumulating means 120 may be adapted to accumulate the digital raw data received by the receiving means 110 into the first storage section 140a of the storage media 140 at the first processing rate.

The digital raw data may include pulse code modulation data (simply referred to as "PCM data"), while the digital coded data may include MPEG-1 Audio Layer 3 (simply referred to as "MP3 data").

Here, the PCM data may be received from the external electronic device 10 by the receiving means 110 at a fundamental transmission rate to be specified by sampling frequency 44.1 kHz and quantifying bit number 16.

The compressing means 131 is adapted to produce digital coded data in association with the digital raw data retrieved from the first storage section 140a of the storage media 140 by compressing the digital raw data retrieved from the first storage section 140a of the storage media 140 into the digital coded data at a third processing rate.

The data accumulating apparatus 200 further comprises measuring means 133 for measuring the amount of the digital raw data retrieved from the first storage section 140a of the storage media 140 over the predetermined period of time by the compressing means 131, judging means 134 for judging whether or not the amount of the digital raw data retrieved from the first storage section 140a of the storage media 140 over the predetermined period of time by the compressing means 131 is larger than a predetermined threshold level on the basis of the measurement of the measuring means 133, and updating means 135 for updating the third processing rate to ensure that the digital raw data retrieved from the first storage section 140a of the storage media 140 is compressed by the compressing means 131 at the updated third processing rate larger than the third processing rate when the judgment is made that the amount of the digital raw data retrieved from the first storage section 140a of the storage media 140 over the predetermined period of time by the compressing means 131 is not larger than the predetermined threshold level.

The data accumulating apparatus 200 further comprises reproducing means 270 for reproducing the specific information from the digital raw data accumulated in the first storage section 140a of the storage media 140.

The measuring means 133 is adapted to measure the amount of the digital raw data retrieved from the first storage section 140a of the storage media 140 by the compressing means 131 before measuring the difference between the amount of the digital raw data accumulated in the first storage section 140a of the storage media 140 by the first accumulating means 120 and the amount of the digital raw data retrieved from the first storage section 140a of the storage media 140 by the compressing means 131.

The judging means 134 is adapted to judge whether or not the amount of the digital raw data retrieved from the first storage section 140a of the storage media 140 over the predetermined period of time by the compressing means 131 is larger than a predetermined threshold level on the basis of the measurement of the measuring means 133 before judging whether or not the difference between the amount of the digital raw data accumulated in the first storage section 140a of the storage media 140 by the first accumulating means 120 and the amount of the digital raw data retrieved from the first storage section 140a of the storage media 140 by the compressing means 131 is larger than a predetermined threshold level on the basis of the measurement of the measuring unit of the measuring means 133.

The updating means 135 is adapted to update the third processing rate to ensure that the digital raw data retrieved from the first storage section 140a of the storage media 140 is compressed by the compressing means 131 at the updated third processing rate larger than the third processing rate when the judgment is made that the difference between the amount of the digital raw data accumulated in the first storage section 140a of the storage media 140 by the first accumulating means 120 and the amount of the digital raw data retrieved from the first storage section 140a of the storage media 140 by the compressing means 131 is larger than a predetermined threshold level.

The data accumulating apparatus 200 further comprises a speaker unit 250, a display unit 260 having a screen, and control signal producing means 136 for producing a control signal to have the display unit 260 display an image in association with the notification message about the, judgment of the judging means 134 on the screen of the display unit 260.

The data accumulating apparatus 200 may further comprises control signal producing means 136 for producing a control signal to have the speaker unit 250 produce a sound in association with the notification message about the judgment of the judging means 134 on the screen of the display unit 260.

The following description will now be directed to the constitution of the data accumulating method according to the second embodiment of the present invention.

The data accumulating method comprises a receiving step of receiving digital raw data about specific information from an external electronic device 10, a first accumulating step of accumulating the digital raw data received by the receiving means 110 into the storage media 140, a compressing step of retrieving the digital raw data from the storage media 140, and producing digital coded data in association with the digital raw data retrieved from the storage media 140 by compressing the digital raw data retrieved from the storage media 140 into the digital coded data, and a second accumulating step of accumulating the digital coded data produced in the compressing step into the storage media 140.

The receiving step is of receiving the digital raw data from the external electronic device 10 at a first processing rate, while the first accumulating step is of accumulating the digital raw data received by the receiving means 110 into the storage media 140 at a second processing rate.

The receiving step includes a measuring step of measuring the amount of the digital raw data received from the external electronic device 10 over a predetermined period of time and the amount of the digital raw data accumulated in the storage media 140 in the first accumulating step over the predetermined period of time, a judging step of judging whether or not the amount of the digital raw data received from the external electronic device 10 over the predetermined period of time is smaller than the amount of the digital raw data accumulated in the storage media 140 in the first accumulating step over the predetermined period of time on the basis of the measurement of the measuring unit, and an updating step of updating the second processing rate to ensure that the digital raw data received in the first receiving step is accumulated in the first accumulating step into the storage media 140 at the updated second processing rate larger than the second processing rate when the judgment is made that the amount of the digital raw data received from the external electronic device 10 over the predetermined period of time is not smaller than the amount of the digital raw data accumulated in the storage media 140 in the first accumulating step over the predetermined period of time.

The compressing step is of producing digital coded data in association with the digital raw data retrieved from the storage media 140 by compressing the digital raw data retrieved from the storage media 140 into the digital coded data at a third processing rate in the compressing step.

The data compressing method further comprises a measuring step of measuring the amount of the digital raw data retrieved from the storage media 140 over the predetermined period of time in the compressing step, a judging step of judging whether or not the amount of the digital raw data retrieved from the storage media 140 over the predetermined period of time in the compressing step is larger than a predetermined threshold level, and an updating step of updating the third processing rate to ensure that the digital raw data retrieved from the storage media 140 is compressed in the compressing step at the updated third processing rate larger than the third processing rate when the judgment is made that the amount of the digital raw data retrieved from the storage media 140 over the predetermined period of time in the compressing step is not larger than the predetermined threshold level.

The data accumulating method further comprises a reproducing step of reproducing the specific information from the digital raw data accumulated in the storage media 140.

The data accumulating method further comprises a decompressing step of retrieving the digital coded data from the storage media 140, and producing digital decoded data from the digital coded data retrieved from the storage media 140 by decompressing the digital coded data retrieved from the storage media 140, and a reproducing step of reproducing the specific information from the digital decoded data produced in the decompressing step.

The compressing step is of producing digital coded data in association with the digital raw data retrieved from the storage media 140 by compressing the digital raw data retrieved from the storage media 140 into the digital coded data at a third processing rate.

The data accumulating method further comprises a measuring step of measuring the amount of the digital raw data retrieved from the storage media 140 over the predetermined period of time in the compressing step, a judging step of judging whether or not the amount of the digital raw data retrieved from the storage media 140 over the predetermined period of time in the compressing step is larger than a predetermined threshold level, and an updating step of updating the third processing rate to ensure that the digital raw data retrieved from the storage media 140 is compressed in the compressing step at the updated third processing rate larger than the third processing rate when the judgment is made that the amount of the digital raw data retrieved from the storage media 140 over the predetermined period of time in the compressing step is not larger than the predetermined threshold level.

The decompressing step is of producing digital decoded data from the digital coded data retrieved from the storage media 140 by decompressing the digital coded data retrieved from the storage media 140 at a fourth processing rate.

The decompressing step includes a measuring step of measuring the amount of the digital decoded data produced in the decompressing step over the predetermined period of time, a judging step of judging whether or not the amount of the digital decoded data produced in the decompressing step over the predetermined period of time is larger than a predetermined threshold level, and an updating step of updating the fourth processing rate to ensure that the digital decoded data is produced in the decompressing step at the updated fourth processing rate larger than the fourth processing rate when the judgment is made that the amount of the digital decoded data retrieved from the storage media 140 over the predetermined period of time in the compressing step is not larger than the predetermined threshold level.

Figure 6:
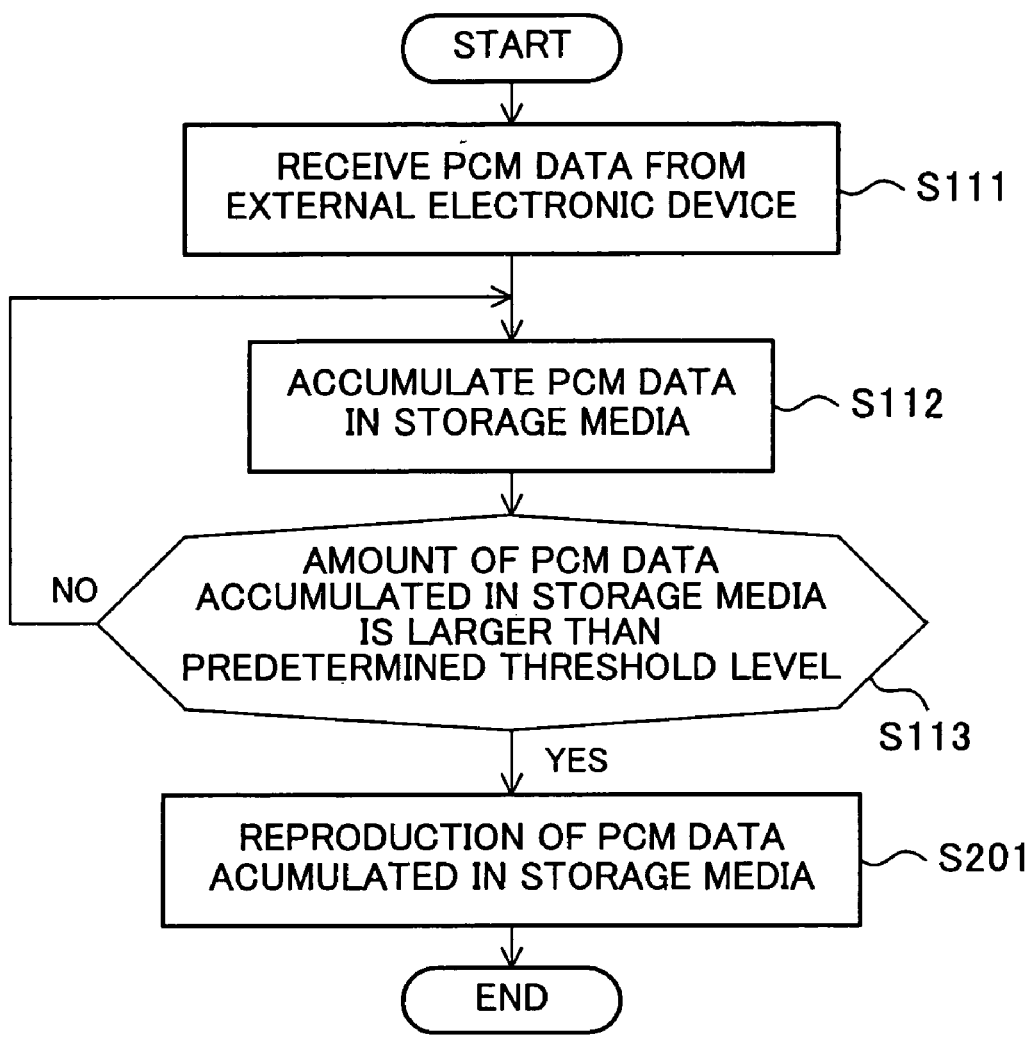
FIG. 6 is a flowchart showing a process of the data accumulating apparatus according to the second embodiment of the present invention.

The operation of the data accumulating apparatus and the data accumulating method according to the second embodiment of the present invention will now be described hereinafter with reference to FIG. 6.

The PCM data is firstly received from the optical disc driver 12 of the external electronic device 10 at the first processing rate by the first receiving means 111. The PCM data received by the first receiving means 110 is sequentially accumulated into the first storage section 140a of the storage media 140 by the first accumulating means 120 in the step S112.

The judgment is then made whether or not the amount of the PCM data accumulated in the first storage section 140a of the storage media 140 is larger than the predetermined threshold level in the step S113.

When the answer in the step S113 is affirmative "YES", i.e., the amount of the PCM data accumulated in the first storage section 140a of the storage media 140 is larger than the predetermined threshold level, the reproduction of the PCM data accumulated in the first storage section 140a of the storage media 140 is sequentially performed by the reproducing means 270.

From the above detail description, it will be understood that the data accumulating method and apparatus according to the second embodiment of the present invention can perform the accumulation and compression of the digital raw data at the relatively high quality.

The following description will now be directed to the third embodiment of the data accumulating method and apparatus according to the present invention.

The data accumulating apparatus 300 is shown in FIG. 7 as comprising storage media 140 having first and second storage sections 141a and 141b different from each other, receiving means 110 for receiving digital raw data about specific information from an external electronic device 10, first accumulating means 120 for accumulating the digital raw data received by the receiving means 110 into the first storage section 140a of the storage media 140, compressing means 131 for retrieving the digital raw data from the first storage section 140a of the storage media 140, and producing digital coded data in association with the digital raw data retrieved from the first storage section 140a of the storage media 140 by compressing the digital raw data retrieved from the first storage section 140a of the storage media 140 into the digital coded data, and second accumulating means 132 for accumulating the digital coded data produced by the compressing means 131 into the second storage section 140b of the storage media 140.

Here, the external electronic device 10 may include a radio set 11 for receiving and producing digital raw data about audio information, and an optical disc driver 12 for producing digital raw data about audio and image information while driving an optical disc such as for example compact disc and digital versatile disc.

The specific information, i.e., digital contents is constituted by at least one of audio sound, video image, still image, and characters data.

The receiving means 110 may be adapted to receive the PCM data from the external electronic device 10 at the first processing rate, while the first accumulating means 120 may be adapted to accumulate the PCM data received by the receiving means 110 into the first storage section 140a of the storage media 140 at the first processing rate.

The digital raw data may include pulse code modulation data (simply referred to as "PCM data"), while the digital coded data may include MPEG-1 Audio Layer 3 (simply referred to as "MP3 data").

Here, the PCM data may be received from the external electronic device 10 by the receiving means 110 at a fundamental transmission rate to be specified by sampling frequency 44.1 kHz and quantifying bit number 16.

The compressing means 131 is adapted to produce digital coded data in association with the digital raw data retrieved from the first storage section 140a of the storage media 140 by compressing the digital raw data retrieved from the first storage section 140a of the storage media 140 into the digital coded data at a third processing rate.

The data accumulating apparatus 300 further comprises measuring means 133 for measuring the amount of the digital raw data retrieved from the first storage section 140a of the storage media 140 over the predetermined period of time by the compressing means 131, judging means 134 for judging whether or not the amount of the digital raw data retrieved from the first storage section 140a of the storage media 140 over the predetermined period of time by the compressing means 131 is larger than a predetermined threshold level on the basis of the measurement of the measuring means 133, and updating means 135 for updating the third processing rate to ensure that the digital raw data retrieved from the first storage section 140a of the storage media 140 is compressed by the compressing means 131 at the updated third processing rate larger than the third processing rate when the judgment is made that the amount of the digital raw data retrieved from the first storage section 140a of the storage media 140 over the predetermined period of time by the compressing means 131 is not larger than the predetermined threshold level.

The data accumulating apparatus 300 further comprises decompressing means 335 for retrieving the digital coded data from the second storage section 140b of the storage media 140, and producing digital decoded data from the digital coded data retrieved from the second storage section 140b of the storage media 140 by decompressing the digital coded data retrieved from the second storage section 140b of the storage media 140, and reproducing means 370 for reproducing the specific information from the digital decoded data produced by the decompressing means 335.

The compressing means 131 is adapted to produce digital coded data in association with the digital raw data retrieved from the first storage section 140a of the storage media 140 by compressing the digital raw data retrieved from the first storage section 140a of the storage media 140 into the digital coded data at a third processing rate.

The data accumulating apparatus 300 further comprises measuring means 133 for measuring the amount of the digital raw data retrieved from the first storage section 140a of the storage media 140 over the predetermined period of time by the compressing means 131, judging means 134 for judging whether or not the amount of the digital raw data retrieved from the first storage section 140a of the storage media 140 over the predetermined period of time by the compressing means 131 is larger than a predetermined threshold level on the basis of the measurement of the measuring means 133, and updating means 135 for updating the third processing rate to ensure that the digital raw data retrieved from the first storage section 140a of the storage media 140 is compressed by the compressing means 131 at the updated third processing rate larger than the third processing rate when the judgment is made that the amount of the digital raw data retrieved from the first storage section 140a of the storage media 140 over the predetermined period of time by the compressing means 131 is not larger than the predetermined threshold level.

The decompressing means 335 is adapted to produce digital decoded data from the digital coded data retrieved from the second storage section 140b of the storage media 140 by decompressing the digital coded data retrieved from the second storage section 140b of the storage media 140 at a fourth processing rate.

The decompressing means 335 includes a measuring unit for measuring the amount of the digital decoded data produced by the decompressing means 335 over the predetermined period of time, a judging unit for judging whether or not the amount of the digital decoded data produced by the decompressing means 335 over the predetermined period of time is larger than a predetermined threshold level on the basis of the measurement of the measuring unit of the decompressing means 335, and an updating unit for updating the fourth processing rate to ensure that the digital decoded data is produced by the decompressing means 335 at the updated fourth processing rate larger than the fourth processing rate when the judgment is made that the amount of the digital decoded data retrieved from the second storage section 140b of the storage media 140 over the predetermined period of time by the compressing means 131 is not larger than the predetermined threshold level.

Figure 8:
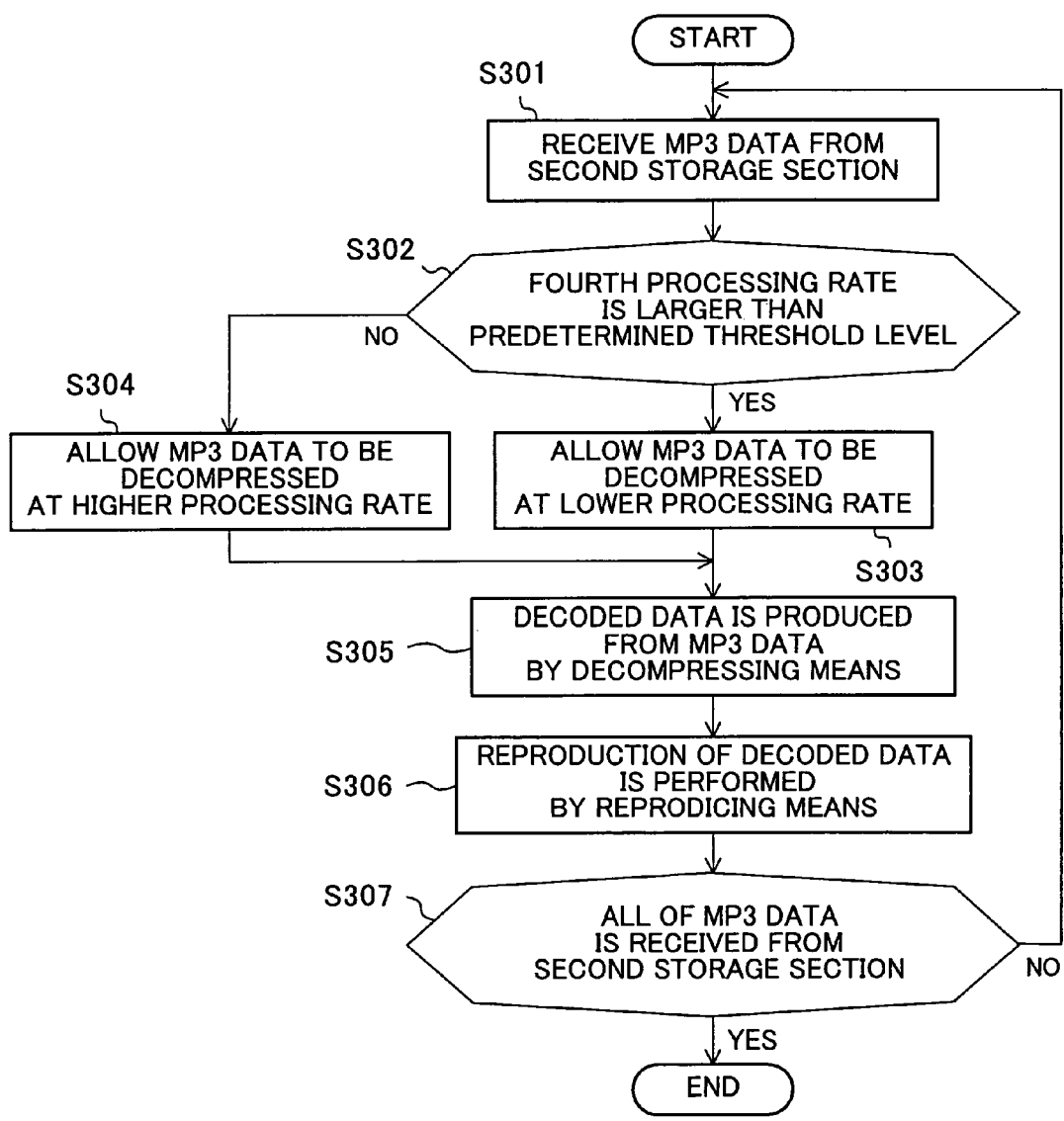
FIG. 8 is a flowchart showing a process of the data accumulating apparatus according to the third embodiment of the present invention.
Figure 9:
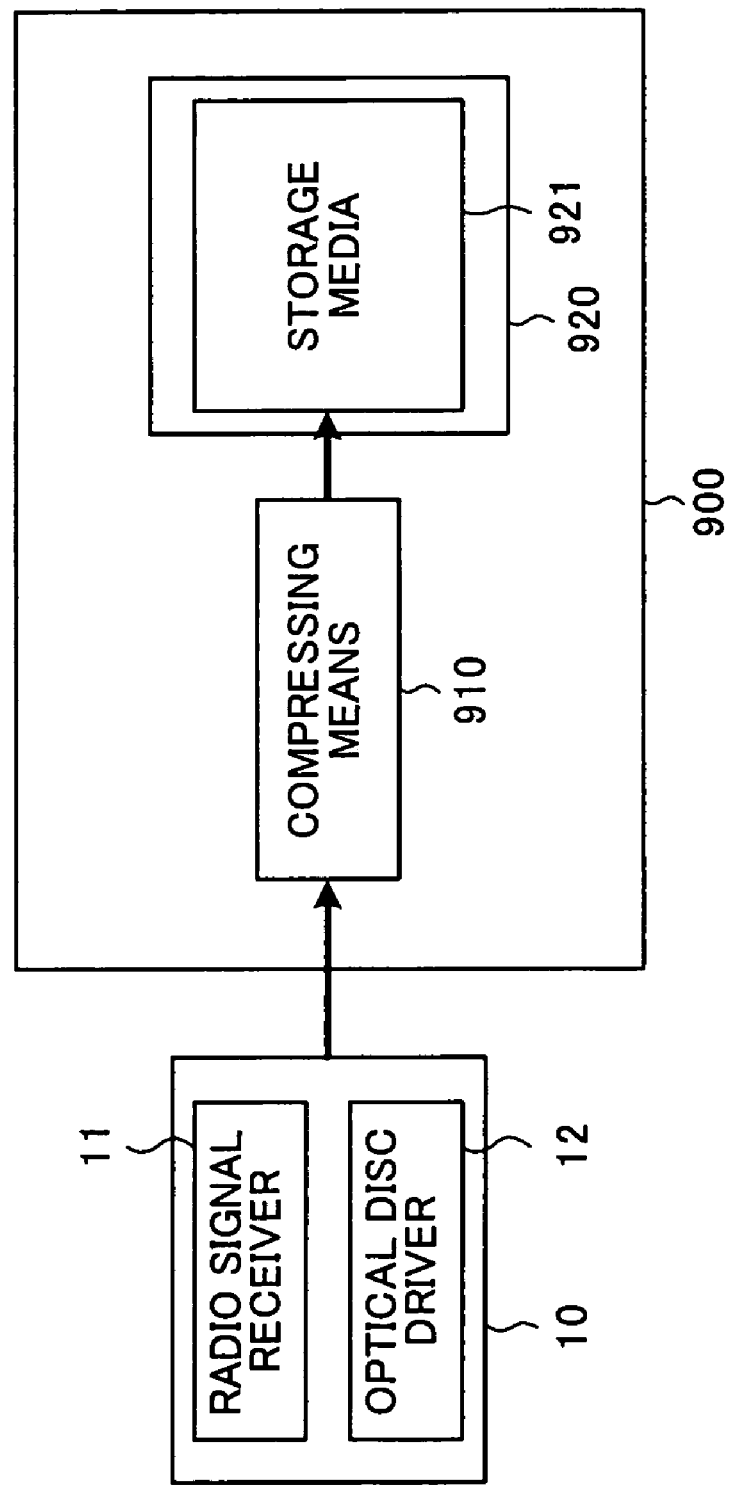
FIG. 9 is a block diagram of the conventional data accumulating apparatus.

The operation of the data accumulating method and apparatus according to the third embodiment of the present invention will now be described hereinafter with reference to FIG. 8.

The MP3 data accumulated in the second storage section 140b of the storage media 140 is sequentially retrieved from the second storage section 140b of the storage media 140 by the decompressing means 335 in the step S301.

The judgment is made whether or not the amount of the MP3 data retrieved from the second storage section 140b of the storage media 140 over predetermined period of time by the decompressing means 335 is larger than the predetermined threshold level in the step S302.

When the answer in the step S302 is affirmative "YES", i.e., the amount of the MP3 data retrieved from the second storage section 140b of the storage media 140 over the predetermined period of time by the decompressing means 335 is larger than the predetermined threshold level, the step S302 proceeds to the step S303.

The fourth processing rate with respect to the decompression of the MP3 data is updated by the decompressing means 335 in the step S303. The digital decoded data is produced from the MP3 data by the decompressing means 335 at the updated fourth processing rate smaller than the current fourth processing rate, i.e., the decompression of the digital coded data is performed by the decompressing means 335 on a relatively low preferential basis in the step S305.

When, on the other hand, the answer in the step S302 is negative "NO", i.e., the amount of the MP3 data retrieved from the second storage section 140b of the storage media 140 over the predetermined period of time by the decompressing means 335 is not larger than the predetermined threshold level, the fourth processing rate with respect to the decompression of the MP3 is updated by the decompressing means 335 in the step S305.

The digital decoded data is produced by the decompressing means 335 at the updated fourth processing rate larger than the current fourth processing rate, i.e., the decompression of the digital coded data is performed by the decompressing means 335 on a relatively high preferential basis in the step S305.

The reproduction of the digital decoded data is produced by the decompressing means 335 is then performed by the reproducing means 370 while the audio sound is outputted by the speaker unit 250, and the video image, the still image, and the character data each is displayed on the screen by the display unit 260 in the step S306.

The judgment is then made whether or not all of the digital coded data accumulated in the second storage section 140b of the storage media 140 is retrieved and decompressed by the decompressing means 335 in the step S307.

When the answer in the step S307 is affirmative "YES", i.e., all of the digital coded data accumulated in the second storage section 140b of the storage media 140 is retrieved and decompressed by the decompressing means 335, the step S307 proceeds to the end.

When, on the other hand, the answer in the step S307 is negative "NO", i.e., all of the digital coded data accumulated in the second storage section 140b of the storage media 140 is not retrieved and decompressed by the decompressing means 335, the step S307 proceeds to the S301.

From the above detail description, it will be understood that the data accumulating method and apparatus according to the third embodiment of the present invention can perform the accumulation and compression of the digital raw data at the relatively high quality.

The data accumulating method and apparatus can accumulate the digital coded data in the second storage section 140*b* of the storage media 140 while performing the decompression of the digital coded data accumulated in the second storage section 140*b* of the storage media 140.

As will be seen from foregoing description, the data accumulating method and apparatus can perform the accumulation and compression of the digital raw data at the relatively high quality without preventing the digital coded data from being deteriorated due to the fact that the accumulation and compression of the digital raw data is performed at relatively low preferential basis.

While the subject invention has been described with relation to the preferred embodiment, various modifications and adaptations thereof will now be apparent to those skilled in the art as far as such modifications and adaptations fall in the scope of the appended claims intended to be covered thereby.

What is claimed is:

1. A data accumulating apparatus, comprising:
   storage media;
   a receiving unit for receiving digital raw data about specific information from an external electronic device;
   a first accumulating unit for accumulating said digital raw data received by said receiving unit into said storage media;
   a compressing unit for retrieving said digital raw data from said storage media, and producing digital coded data in association with said digital raw data retrieved from said storage media by compressing said digital raw data retrieved from said storage media into said digital coded data; and
   a second accumulating unit for accumulating said digital coded data produced by said compressing unit into said storage media,
   wherein said receiving unit includes a compensation unit for measuring an amount of said digital raw data received from said external electronic device over a predetermined period of time and an amount of said digital raw data accumulated in said storage media by said first accumulating unit over said predetermined period of time and for updating the processing rate of the first accumulating unit based on the measured amounts of said digital raw data received and accumulated.

2. The data accumulating apparatus as set forth in claim 1, in which said receiving unit is adapted to receive said digital raw data from said external electronic device at a first processing rate, and said first accumulating unit is adapted to accumulate said digital raw data received by said receiving unit into said storage media at a second processing rate; and in which
   said compensation unit includes
   a measuring unit for measuring the amount of said digital raw data received from said external electronic device over the predetermined period of time and the amount of said digital raw data accumulated in said storage media by said first accumulating unit over said predetermined period of time,
   a judging unit for judging whether or not to update said second processing rate on the basis of said amount measured by said measuring unit, and
   an updating unit for updating said second processing rate to ensure that said digital raw data received by said receiving unit is accumulated by said first accumulating unit into said storage media at said updated second processing rate larger than said current second processing rate when the judgment is made that said amount of said digital raw data received from said external electronic device over said predetermined period of time is not smaller than said amount of said digital raw data accumulated in said storage media by said first accumulating unit over said predetermined period of time.

3. The data accumulating apparatus as set forth in claim 2, wherein said compensation unit constitutes a direct media access controller.

4. The data accumulating apparatus as set forth in claim 2, in which said compressing unit is adapted to produce digital coded data in association with said digital raw data retrieved from said storage media by compressing said digital raw data retrieved from said storage media into said digital coded data at a third processing rate, and which further comprises
   a second measuring unit for measuring the amount of said digital raw data retrieved from said storage media over said predetermined period of time by said compressing unit;
   a second judging unit for judging whether or not to update said third processing rate on the basis of said amount measured by said second measuring unit; and
   a second updating unit for updating said third processing rate to ensure that said digital raw data retrieved from said storage media is compressed by said compressing unit at said updated third processing rate larger than said current third processing rate when the judgment is made that said amount of said digital raw data retrieved from said storage media over said predetermined period of time by said compressing unit is not larger than a predetermined threshold level.

5. The data accumulating apparatus as set forth in claim 2, which further comprises a reproducing unit for reproducing said specific information from said digital raw data accumulated in said storage media.

6. The data accumulating apparatus as set forth in claim 2, which further comprises a decompressing unit for retrieving said digital coded data from said storage media, and producing digital decoded data from said digital coded data retrieved from said storage media by decompressing said digital coded data retrieved from said storage media, and a reproducing unit for reproducing said specific information from said digital decoded data produced by said decompressing unit.

7. The data accumulating apparatus as set forth in claim 6, in which said compressing unit is adapted to produce digital coded data in association with said digital raw data retrieved from said storage media by compressing said digital raw data retrieved from said storage media into said digital coded data at a third processing rate, and which further comprises
   a second measuring unit for measuring the amount of said digital raw data retrieved from said storage media over said predetermined period of time by said compressing unit;
   a second judging unit for judging whether or not to update said third processing rate on the basis of said amount measured by said second measuring unit; and
   a second updating unit for updating said third processing rate to ensure that said digital raw data retrieved from said storage media is compressed by said compressing unit at said updated third processing rate larger than said current third processing rate when the judgment is made that said amount of said digital raw data retrieved from said storage media over said predetermined period of time by said compressing unit is not larger than a predetermined threshold level.

8. The data accumulating apparatus as set forth in claim 7, in which said decompressing unit is adapted to produce digital decoded data from said digital coded data retrieved from said storage media by decompressing said digital coded data retrieved from said storage media at a fourth processing rate, and in which said decompressing unit includes a third measuring unit for measuring the amount of said digital decoded data produced by said decompressing unit over said predetermined period of time;

a third judging unit for judging whether or not to update said fourth processing rate on the basis of said amount measured by said third measuring unit of said decompressing unit; and a third updating unit for updating said fourth processing rate to ensure that said digital decoded data is produced by said decompressing unit at said updated fourth processing rate larger than said current fourth processing rate when the judgment is made that said amount of said digital decoded data retrieved from said storage media over said predetermined period of time by said compressing unit is not larger than a predetermined threshold level.

9. A data accumulating apparatus, comprising:

storage media having first and second storage sections different from each other;

a receiving unit for receiving digital raw data about specific information from an external electronic device;

a first accumulating unit for accumulating said digital raw data received by said receiving unit into said first storage section of said storage media;

a compressing unit for retrieving said digital raw data from said first storage section of said storage media, and producing digital coded data in association with said digital raw data retrieved from said first storage section of said storage media by compressing said digital raw data retrieved from said first storage section of said storage media into said digital coded data; and a second accumulating unit for accumulating said digital coded data produced by said compressing unit into said second storage section of said storage media, wherein said receiving unit includes a compensation unit for measuring an amount of said digital raw data received from said external electronic device over a predetermined period of time and an amount of said digital raw data accumulated in said storage media by said first accumulating unit over said predetermined period of time and for updating the processing rate of the first accumulating unit based on the measured amounts of said digital raw data received and accumulated.

10. The data accumulating apparatus as set forth in claim 9, in which said receiving unit is adapted to receive said digital raw data from said external electronic device at a first processing rate, and said first accumulating unit is adapted to accumulate said digital raw data received by said receiving unit into said first storage section of said storage media at a second processing rate; and in which said compensation unit includes a measuring unit for measuring the amount of said digital raw data received from said external electronic device over the predetermined period of time and the amount of said digital raw data accumulated in said first storage section of said storage media by said first accumulating unit over said predetermined period of time, a judging unit for judging whether or not to update said second processing rate on the basis of said amount measured by said measuring unit, and an updating unit for updating said second processing rate to ensure that said digital raw data received by said receiving unit is accumulated by said first accumulating unit into said first storage section of said storage media at said updated second processing rate larger than said current second processing rate when the judgment is made that said amount of said digital raw data received from said external electronic device over said predetermined period of time is not smaller than said amount of said digital raw data accumulated in said first storage section of said storage media by said first accumulating unit over said predetermined period of time.

11. The data accumulating apparatus as set forth in claim 10, wherein said compensation unit constitutes a direct media access controller.

12. The data accumulating apparatus as set forth in claim 10, in which said compressing unit is adapted to produce digital coded data in association with said digital raw data retrieved from said first storage section of said storage media by compressing said digital raw data retrieved from said first storage section of said storage media into said digital coded data at a third processing rate, and which further comprises a second measuring unit for measuring the amount of said digital raw data retrieved from said first storage section of said storage media over said predetermined period of time by said compressing unit;

a second judging unit for judging whether or not to update said third processing rate on the basis of said amount measured by said second measuring unit; and a second updating unit for updating said third processing rate to ensure that said digital raw data retrieved from said first storage section of said storage media is compressed by said compressing unit at said updated third processing rate larger than said current third processing rate when the judgment is made that said amount of said digital raw data retrieved from said first storage section of said storage media over said predetermined period of time by said compressing unit is not larger than a predetermined threshold level.

13. The data accumulating apparatus as set forth in claim 10, which further comprises a reproducing unit for reproducing said specific information from said digital raw data accumulated in said first storage section of said storage media.

14. The data accumulating apparatus as set forth in claim 10, which further comprises a decompressing unit for retrieving said digital coded data from said second storage section of said storage media, and producing digital decoded data from said digital coded data retrieved from said second storage section of said storage media by decompressing said digital coded data retrieved from said second storage section of said storage media, and a reproducing unit for reproducing said specific information from said digital decoded data produced by said decompressing unit.

15. The data accumulating apparatus as set forth in claim 13, in which said compressing unit is adapted to produce digital coded data in association with said digital raw data retrieved from said first storage section of said storage media by compressing said digital raw data retrieved from said first storage section of said storage media into said digital coded data at a third processing rate, and which further comprises a second measuring unit for measuring the amount of said digital raw data retrieved from said first storage section of said storage media over said predetermined period of time by said compressing unit;

a second judging unit for judging whether or not to update said third processing rate on the basis of said amount measured by said second measuring unit; and a second updating unit for updating said third processing rate to ensure that said digital raw data retrieved from said first storage section of said storage media is compressed by said compressing unit at said updated third processing rate larger than said current third processing rate when the judgment is made that said amount of said digital raw data retrieved from said first storage section of said storage media over said predetermined period of time by said compressing unit is not larger than a predetermined threshold level.

16. The data accumulating apparatus as set forth in claim 15, in which a decompressing unit is adapted to produce digital decoded data from said digital coded data retrieved from said second storage section of said storage media by decompressing said digital coded data retrieved from said second storage section of said storage media at a fourth processing rate, and in which said decompressing unit includes a third measuring unit for measuring the amount of said digital decoded data produced by said decompressing unit over said predetermined period of time;

a third judging unit for judging whether or not to update said fourth processing rate on the basis of said amount measured by said third measuring unit of said decompressing unit; and a third updating unit for updating said fourth processing rate to ensure that said digital decoded data is produced by said decompressing unit at said updated fourth processing rate larger than said current fourth processing rate when the judgment is made that said amount of said digital decoded data retrieved from said second storage section of said storage media over said predetermined period of time by said compressing unit is not larger than a predetermined threshold level.

17. The data accumulating apparatus as set forth in claim 12, in which said second measuring unit is adapted to measure said amount of said digital raw data retrieved from said first storage section of said storage media by said compressing unit before measuring the difference between the amount of said digital raw data accumulated in said first storage section of said storage media by said first accumulating unit and said amount of said digital raw data retrieved from said first storage section of said storage media by said compressing unit, and said second judging unit is adapted to judge whether or not to update said third processing rate on the basis of said amount measured by said second measuring unit, and in which said second updating unit is adapted to update said third processing rate to ensure that said digital raw data retrieved from said first storage section of said storage media is compressed by said compressing unit at said updated third processing rate larger than said current third processing rate when the judgment is made that said difference between said amount of said digital raw data accumulated in said first storage section of said storage media by said first accumulating unit and said amount of said digital raw data retrieved from said first storage section of said storage media by said compressing unit is larger than a predetermined threshold level.

18. The data accumulating apparatus as set forth in claim 17, which further comprises a display unit having a screen; and a control signal producing unit for producing a control signal to have said display unit display an image in association with the notification message about the judgment of said second judging unit on said screen of said display unit.

19. The data accumulating apparatus as set forth in claim 17, which further comprises a speaker unit; and a control signal producing unit for producing a control signal to have said speaker unit produce a sound in association with the notification message about the judgment of said second judging unit on a screen of a display unit.

20. A data accumulating method using an external device and storage media, comprising:

receiving digital raw data about specific information from said external electronic device;

accumulating said digital raw data received into said storage media;

retrieving said digital raw data from said storage media, and producing digital coded data in association with said digital raw data retrieved from said storage media by compressing said digital raw data retrieved from said storage media into said digital coded data; and accumulating said digital coded data produced by said compressing of said digital raw data into said storage media, wherein said receiving of the digital raw data includes measuring an amount of said digital raw data received from said external electronic device over a predetermined period of time and an amount of said digital raw data accumulated in said storage media over said predetermined period of time and updating the processing rate of the digital raw data being accumulated based on the measured amounts of said digital raw data received and accumulated.

21. The data accumulating method as set forth in claim 20, wherein said receiving of said digital raw data from said external electronic device includes receiving said digital raw data from said external electronic device at a first processing rate, and said accumulating of said digital raw data received into said storage media includes accumulating said digital raw data received into said storage media at a second processing rate; and in which said receiving of said digital raw data further includes judging whether or not to update said second processing rate on the basis of said measured amounts of said digital raw data received and accumulated, and updating said second processing rate to ensure that said received digital raw data is accumulated into said storage media at said updated second processing rate larger than said current second processing rate when the judgment is made that said amount of said digital raw data received from said external electronic device over said predetermined period of time is not smaller than said amount of said digital raw data accumulated in said storage media over said predetermined period of time.

22. The data accumulating method as set forth in claim 21, in which said compressing is of producing digital coded data in association with said digital raw data retrieved from said storage media by compressing said digital raw data retrieved from said storage media into said digital coded data at a third processing rate in said compressing, and which further comprises an amount of said digital raw data retrieved from said storage media over said predetermined period of time;

judging whether or not to update said third processing rate on the basis of said measured amount of said digital raw data retrieved from said storage media; and updating said third processing rate to ensure that said digital raw data retrieved from said storage media is compressed at said updated third processing rate larger than said current third processing rate when the further judgment is made that said amount of said digital raw data retrieved from said storage media over said predetermined period of time is not larger than a predetermined threshold level.

23. The data accumulating method as set forth in claim 21, which further comprises reproducing said specific information from said digital raw data accumulated in said storage media.

24. The data accumulating method as set forth in claim 21, which further comprises retrieving said digital coded data from said storage media, and producing digital decoded data from said digital coded data retrieved from said storage media by decompressing said digital coded data retrieved from said storage media, and reproducing said specific information from said produced digital decoded data.

25. The data accumulating method as set forth in claim 24, in which said compressing is of producing digital coded data in association with said digital raw data retrieved from said storage media by compressing said digital raw data retrieved from said storage media into said digital coded data at a third processing rate, and which further comprises measuring an amount of said digital raw data retrieved from said storage media over said predetermined period of time;

judging whether or not to update said third processing rate on the basis of said measured amount of said digital raw data retrieved; and updating said third processing rate to ensure that said digital raw data retrieved from said storage media is compressed at said updated third processing rate larger than said current third processing rate when the judgment is made that said measured amount of said digital raw data retrieved from said storage media over said predetermined period of time in said compressing is not larger than a predetermined threshold level.

26. The data accumulating method as set forth in claim 25, in which said decompressing is of producing digital decoded data from said digital coded data retrieved from said storage media by decompressing said digital coded data retrieved from said storage media at a fourth processing rate, and in which said decompressing includes measuring an amount of said digital decoded data produced in said decompressing over said predetermined period of time;

judging whether or not to update said fourth processing rate on the basis of said measured amount of digital decoded data produced; and updating said fourth processing rate to ensure that said digital decoded data is produced at said updated fourth processing rate larger than said current fourth processing rate when the judgment is made that said measured amount of said digital decoded data retrieved from said storage media over said predetermined period of time in said compressing is not larger than a predetermined threshold level.

27. The data accumulating apparatus, comprising:

storage media;

a receiving unit for receiving digital raw data about specific information from an external electronic device;

a first accumulating unit for accumulating said digital raw data received by said receiving unit into said storage media;

a computer unit for executing at least two different programs including first and second programs different from each other, wherein said first program includes retrieving said digital raw data from said storage media, and producing digital coded data in association with said digital raw data retrieved from said storage media by compressing said digital raw data retrieved from said storage media into said digital coded data, and accumulating said digital coded data produced by compressing into said storage media at a third processing rate in association with a priority for the compression of said digital raw data retrieved from said storage media, and said second program includes measuring an amount of said digital raw data retrieved from said storage media over a predetermined period of time, judging whether or not to update said third processing rate on the basis of said measured amount said digital raw data retrieved from said storage media, and updating said third processing rate to ensure that said digital raw data retrieved from said storage media is compressed at said updated third processing rate larger than said current third processing rate when the judgment is made that said amount of said digital raw data retrieved from said storage media over said predetermined period of time is not larger than a predetermined threshold level.

28. The data accumulating apparatus as set forth in claim 27, in which said first program includes reproducing said specific information from said digital raw data accumulated in said storage media.

29. The data accumulating apparatus as set forth in claim 27, in which said first program includes retrieving said digital coded data from said storage media, and producing digital decoded data from said digital coded data retrieved from said storage media by decompressing said digital coded data retrieved from said storage media at a fourth processing rate in association with a priority for the decompression of said digital coded data retrieved from said storage media, and reproducing said specific information from said digital decoded data produced, and in which said second program includes measuring the amount of said digital decoded data produced over said predetermined period of time, judging whether or not to update said fourth processing rate on the basis of said measured amount of said digital decoded data produced, and updating said fourth processing rate to ensure that said digital decoded data is produced at said updated fourth processing rate larger than said current fourth processing rate when the judgment is made that said amount of said digital decoded data retrieved from said storage media over said predetermined period of time is not larger than a predetermined threshold level.

\* \* \* \* \*

UNITED STATES PATENT AND TRADEMARK OFFICE
CERTIFICATE OF CORRECTION

PATENT NO. : 7,133,226 B2
APPLICATION NO. : 10/839312
DATED : November 7, 2006
INVENTOR(S) : Yuji Kaihotsu et al.

It is certified that error appears in the above-identified patent and that said Letters Patent is hereby corrected as shown below:

Title Page, Item (56) References Cited, FOREIGN PATENT DOCUMENTS
Change "WO    WO01/28222" to -- WO        01/28222 --

Column 29
Line 4, before "an" add -- measuring --

Column 30
Line 27, after "amount" add -- of --

Signed and Sealed this

First Day of May, 2007

JON W. DUDAS
*Director of the United States Patent and Trademark Office*